United States Patent
Pounds et al.

(10) Patent No.: US 10,423,622 B2
(45) Date of Patent: Sep. 24, 2019

(54) DATABASE ACCESS USING A SPACE-FILLING CURVE

(71) Applicant: eBay Inc., San Jose, CA (US)

(72) Inventors: Jennica Pounds, Bellevue, WA (US); Jiaxin Shan, Kirkland, WA (US); Xiangdong Peng, Issaquah, WA (US)

(73) Assignee: eBay Inc., San Jose, CA (US)

( * ) Notice: Subject to any disclaimer, the term of this patent is extended or adjusted under 35 U.S.C. 154(b) by 291 days.

(21) Appl. No.: 15/063,338

(22) Filed: Mar. 7, 2016

(65) Prior Publication Data
US 2017/0255682 A1    Sep. 7, 2017

(51) Int. Cl.
*G06F 17/30* (2006.01)
*G06F 16/2455* (2019.01)
*G06F 16/22* (2019.01)

(52) U.S. Cl.
CPC .... *G06F 16/24552* (2019.01); *G06F 16/2228* (2019.01); *G06F 16/2246* (2019.01)

(58) Field of Classification Search
CPC ......... G06F 17/30333; G06F 17/30321; G06F 17/30424
See application file for complete search history.

(56) References Cited

U.S. PATENT DOCUMENTS

| | | | |
|---|---|---|---|
| 7,321,890 B2 | 1/2008 | Tropf | |
| 2001/0042240 A1* | 11/2001 | Ng | G06F 8/427 |
| | | | 717/122 |
| 2004/0177065 A1* | 9/2004 | Tropf | G06F 17/30333 |
| 2010/0082654 A1* | 4/2010 | Zhang | G06F 17/30424 |
| | | | 707/759 |
| 2010/0185692 A1* | 7/2010 | Zhang | G06F 17/30327 |
| | | | 707/803 |
| 2010/0306222 A1* | 12/2010 | Freedman | G06F 17/30961 |
| | | | 707/759 |
| 2015/0186051 A1* | 7/2015 | Gurajada | G06F 3/0611 |
| | | | 711/113 |

OTHER PUBLICATIONS

Dr. Dobb's, "Space-Filling Curves in Geospatial Applications", Retrieved from the Internet URL: <http://www.drdobbs.com/database/space-filling-curves-in-geospatial-appli/184410998>, Jul. 1, 1999, pp. 1-5.

(Continued)

*Primary Examiner* — Hung Q Pham
(74) *Attorney, Agent, or Firm* — Schwegman Lundberg & Woessner, P.A.

(57) ABSTRACT

Disclosed is an approach for improved access of databases using a space-filling curve, such as a z-order curve, and a sparse tree. The space-filling curve traverses every point in n-dimensional space of a multidimensional data structure. The sparse tree can be implemented as a cache to store which rows of the multidimensional data structure have actual data. The sparse tree may have one or more nodes merged into a single node, The sparse tree may have one or more node limits at each node that limit node spawning. Node counters track how many rows containing data not mapped correspond to each node. As the multidimensional data structure is searched, the search path is adjusted by reseeking back to rows that are located in the sparse tree. Further, the search path is adjusted by reseeking back to rows that are located within a query box.

20 Claims, 17 Drawing Sheets

(56) References Cited

OTHER PUBLICATIONS

Guttman, "R-Trees: A Dynamic Index Structure for Spatial Searching", 1984, pp. 48-57.

Lu, et al., "Comparing Z-Order B-Tree and R-Tree Family for Spatial Query Processing", Computer Science Department, University of Minnesota, Dec. 3, 2000, 5 pages.

Volker, et al., "Multidimensional Access Methods", ACM Computing Surveys, vol. 30 No. 2:, Jun. 1998, pp. 170-231.

* cited by examiner

DATABASE ACCESS USING A SPACE-FILLING CURVE

TECHNICAL FIELD

The present application relates generally to the technical field of database management, and, in various embodiments, to systems and methods for efficiently accessing a database using one or more space-filling curves.

BACKGROUND

With the explosive growth of network technologies, including the Internet and mobile devices, the amount of data to be saved, indexed, and retrieved has drastically increased. To store data for easy retrieval, databases have increased in size and complexity. However, the rate at which data is generated has created issues for storage-related technologies. One approach for storing data involves large "Big Data" systems, some of which may be managed in a NoSQL scheme, in which data is distributed across nodes and queries are generated, translated, and delegated to a number of nodes for local processing of data (e.g., as in Hadoop, HFDS, or HBase file system(s)). Other approaches, such as those of conventional relational database techniques, tend to handle the increase of data to be stored with sheer computational power. Yet both approaches commonly rely on multiple computer systems working in concert to perform tasks.

Scaling across multiple computer systems necessitates global indexing of files across the system so that each of the computers in the system knows where each file resides. Global indexing creates a bottleneck that is not easily fixed. As more files are added and indexed, the entire system must be synced, which takes time and slows the system down. One approach to the scaling and indexing issue is to store files in sorted order when received, the rationale being that if the files are always sorted, then syncing is not necessary as each computer or computational node knows how to traverse the sorted index to locate a given file.

However, the sorted approach creates new issues as to data records with many columns and queries that specify those columns. For example, if a record has many columns and a query specifies several of the columns, the system may be able to sort only one column at a time. Thus, a first column is sorted, then a second column, et cetera, until target query data is parsed and ready to provide to a user or program as query results. However, this approach becomes slow and unmaintainable for large data stores having many columns and multitudes of rows, for example, such as those that regularly occur in large enterprise networks or modern Internet environments.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
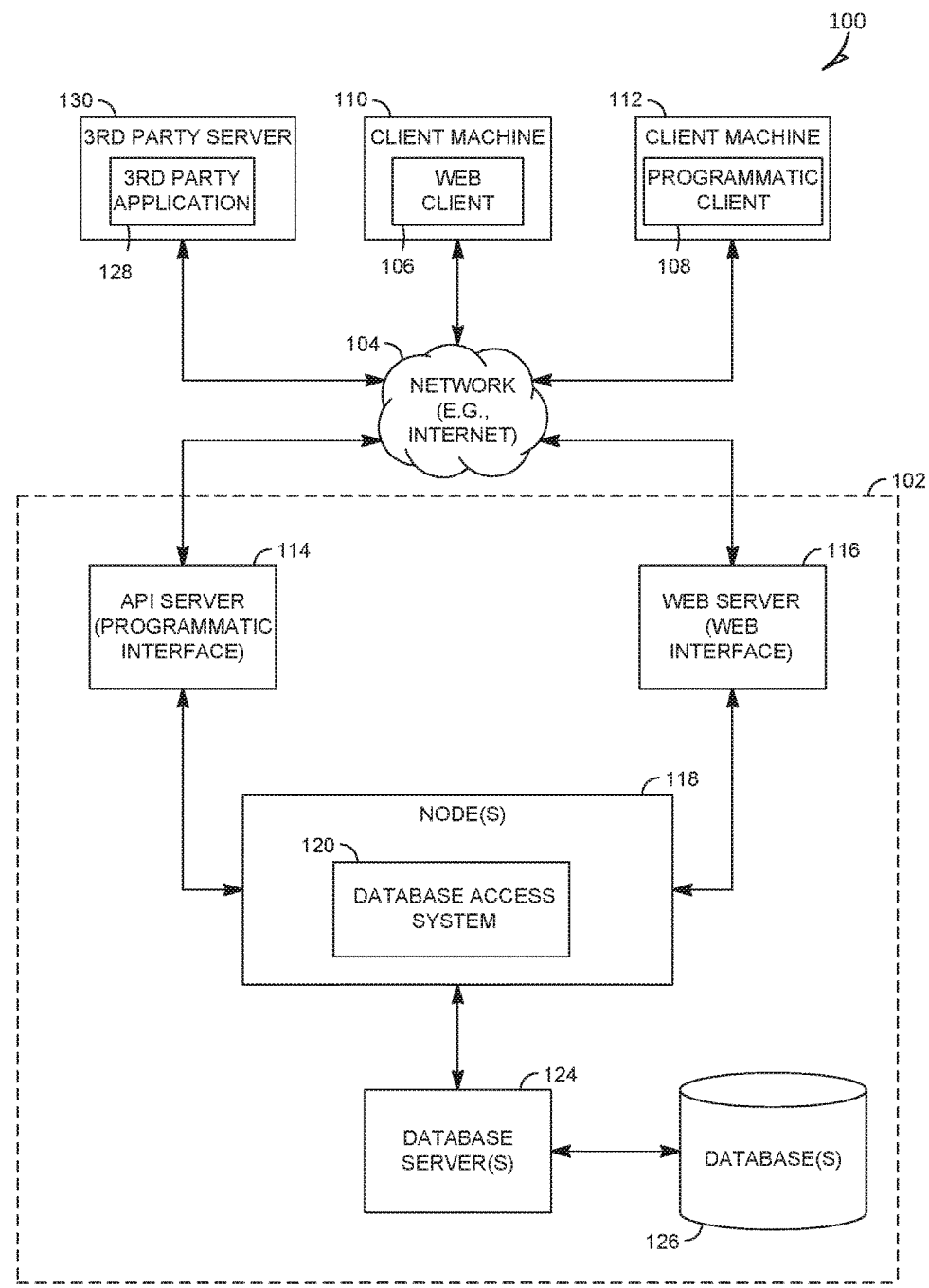
FIG. 1 is a network diagram depicting a client-server system, within which one example embodiment may be deployed.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes systems and methods for efficiently accessing a database using a space-tilling curve and a sparse tree. The columns of a database may correspond to dimensions of a multidimensional data structure. An n-dimensional space-filing curve may traverse intersections of the multidimensional database. Each intersection may be identified using interleaved coordinates from respective dimensions. Each intersection corresponds to a row of the physical database. Not all intersections of the multidimensional database store data; the intersections that do store data may be tracked in a cache. In some embodiments, the cache is implemented as a sparse tree, which may be a binary tree having merged nodes and spawn limits. When a database access request (e.g., a query) is received, a query box is identified, and a first row is identified within the query box.

The multidimensional database is searched using the space-filling curve as a path, and checks against the sparse tree are performed to ascertain whether a given intersection (e.g., row) contains data in the database. In some embodiments, the search path is adjusted by first seeking the next row. Next, a determination may be performed to determine whether the next row is in the query box. If the next row is not in the query box, the search process may advance to the nearest row that is in the query box. The nearest row in the query box may be advanced to using the space-filling curve. Next, the nearest row that is in the query box is analyzed to determine whether that row is in the sparse tree. If the nearest row that is in the query box is not in the sparse tree, the search process may advance to the nearest row that is in the sparse tree. The nearest row that is in the sparse tree may identified numerically by analyzing the numerical value of a node and seeking to the node having the next largest value. The process may be repeated until a row is found that is both in the tree and in the query box. In some embodiments, the lower boundary and upper boundary for a query box are identified using the sparse tree. Once the boundaries are identified, the query box is adjusted by moving the top and bottom of the query box to the identified lower and upper boundaries.

In some embodiments, a method for accessing a database includes identifying a first row in the database using a curve data structure, such as a Z-order curve that is Morton encodable. The first row may be located within a group of ranges at a first point along the curve data structure. The ranges may correspond to respective dimensions of data in a database. For example, the ranges may correspond to columns of a database. A tree data structure is accessed to determine whether the first row is in a cache, where the cache comprises the rows or cell-values of the database. In at least one embodiment, in response to determining that the first row is not in the cache, a second row of the database is identified using the curve data structure. The second row may be located within the group of ranges (e.g., a same group of ranges that comprises the first row) at a second point along the curve data structure, further down the curve, for example. Alternatively, in some embodiments, in response to determining that the first row is in fact in the cache and thus located in the database, one or more values from the first row may be returned as a result to a query. In some embodiments, other types of database procedures than queries (e.g., insertions, deletions, or modifications of data in the database) may similarly be performed.

The tree data structure may, in at least one embodiment, be a binary tree data structure having merged nodes, which are nodes that correspond to two different node values. In some embodiments, the tree data structure implements a node spawning threshold such that the threshold must be met before more nodes can be spawned from a parent node.

In some embodiments, the rows to be searched may be limited using an upper boundary or a lower boundary so that a search of database values may proceed along the curve but omit rows located beyond the upper or lower boundaries. In some embodiments, the upper and lower boundaries are applied to all dimensions or ranges of the database, while in some embodiments, only one dimension or range may be limited by the upper and lower boundaries. In some embodiments, the group of ranges corresponds to a group of rows, and the tree data structure is used to determine whether each row in the group of rows is in the cache.

FIG. 1 is a network diagram depicting a client-server system 100, within which one example embodiment may be deployed. A networked system 102, in the example forms of a network-based publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Washington State) and a programmatic client 108 executing on respective client machines 110 and 112.

An API server 114 and a web server 116 are coupled to, and provide programmatic and web interfaces respectively to, one or more nodes 118, which may be implemented as physical host servers, virtual machines, or containerized computing entities (e.g., Linux containers, operating-system level virtualizations). The one or more nodes 118 may host a database access system 120, which may be used to access a curve data structure and a tree data structure as disclosed in further detail below. In some embodiments, the database access system 120 may be implemented as software application(s) or hardware.

The one or more nodes 118 are, in turn, shown to be coupled to one or more database servers 124 that facilitate access to one or more databases 126. In some embodiments, the one or more database access applications 120 are integrated into the database servers 124, while in some embodiments, the one or more database access applications 120 are built as separate components (e.g., nodes 118) that interface with the one or more database servers 124.

The one or more database access applications 120 provide a number of database or publication system functions and services to users who access the networked system 102. While the one or more database access applications 120 are shown in FIG. 1 to form part of the networked system 102, it will be appreciated that, in alternative embodiments, the one or more database access applications 120 may form part of a database system that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various one or more database access applications 120 could also be implemented as stand-alone software programs, which do not necessarily have networking capabilities.

The web client 106 accesses the one or more database access applications 120 via the web interface supported by the web server 116. Similarly, the programmatic client 108 accesses the various services and functions provided by the one or more database access applications 120 via the programmatic interface provided by the API server 114. The programmatic client 108 may, for example, have executable code to configure curve data, configure tree data, or perform database actions (e.g., CRUD: create, read, update, delete) on data in the database 126 using the one or more database access applications 120.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more promotional, marketplace, or payment functions that are supported by the relevant applications of the networked system 102 and may use the one or more database access applications 120 to more efficiently access data in the database 126 as it becomes required to carry out tasks for the marketplace.

Figure 2:
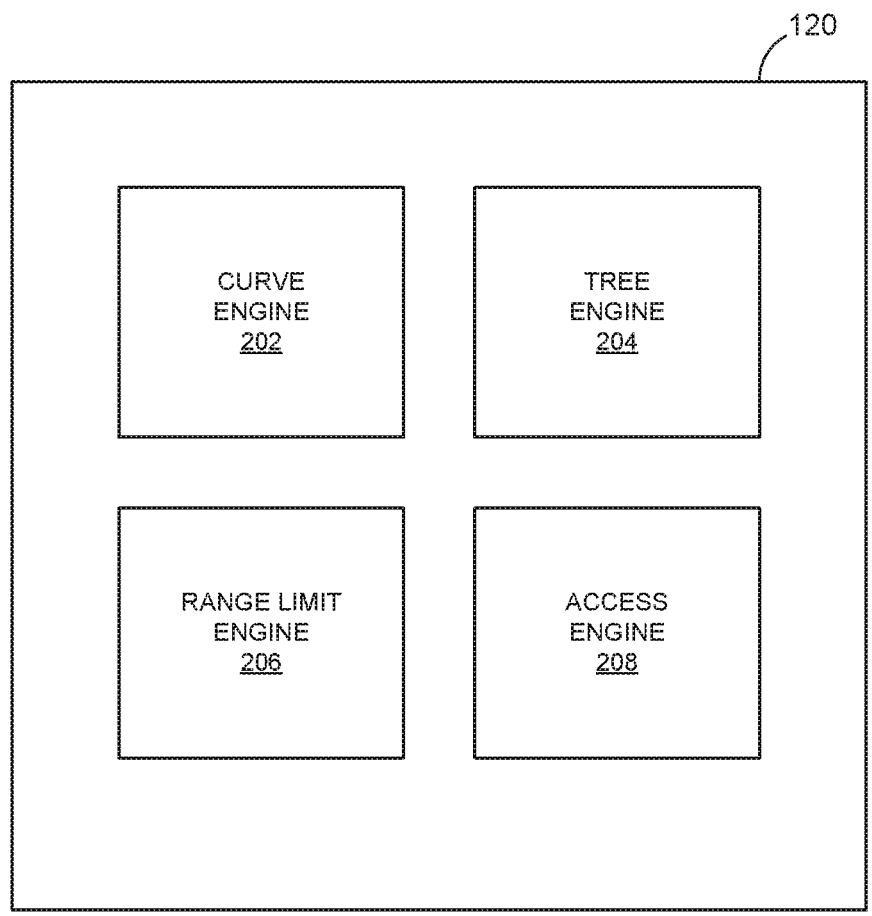
FIG. 2 illustrates a block diagram showing components provided within a networked system, as according to some embodiments.

FIG. 2 illustrates a block diagram showing components provided within the database access a.pplication(s) 120, as according to some embodiments. The database access application(s) 120 is hosted on dedicated or shared server machines (not shown) that are communicatively coupled to enable communications between the server machines. The components themselves are communicatively coupled (e.g., via appropriate interfaces) to each other and to various data sources, so as to allow information to be passed between the applications or so as to allow the applications to share and access common data. Furthermore, the components access the one or more databases 126 via the database servers 124 and the database access application 120.

The database access a.pplication(s) 120 provide a number of curve, tree, and database access mechanisms that allow the system 100 to more efficiently access data in the database 126. To this end, the database access application(s) 120 comprises at least one curve engine 202. Generally, a space-filling curve is a line-based data construct that can "fill" or traverse all points in an n-dimensional space. For example, in two dimensions (2D), a Hilbert curve is a one-dimensional curve that can span every point in the 2D space over many iterations. Space-filling curves can also fill higher-dimensional space, such as 3D, 4D, . . . , n-D space in the same way: spanning all points in the space over many iterations.

Some space-filling curves, such as a z-order curve, can be used to encode data in a database. A z-order curve encodes data from multiple dimensions to one dimension (that of the curve) by interleaving binary coordinates of each dimension for each point along the curve. Each point along the curve can be specified by referring to the interleaved or alternating coordinates. The interleaved coordinates may correspond to keys of a sorted-key database, such as HBase.

Figure 3:
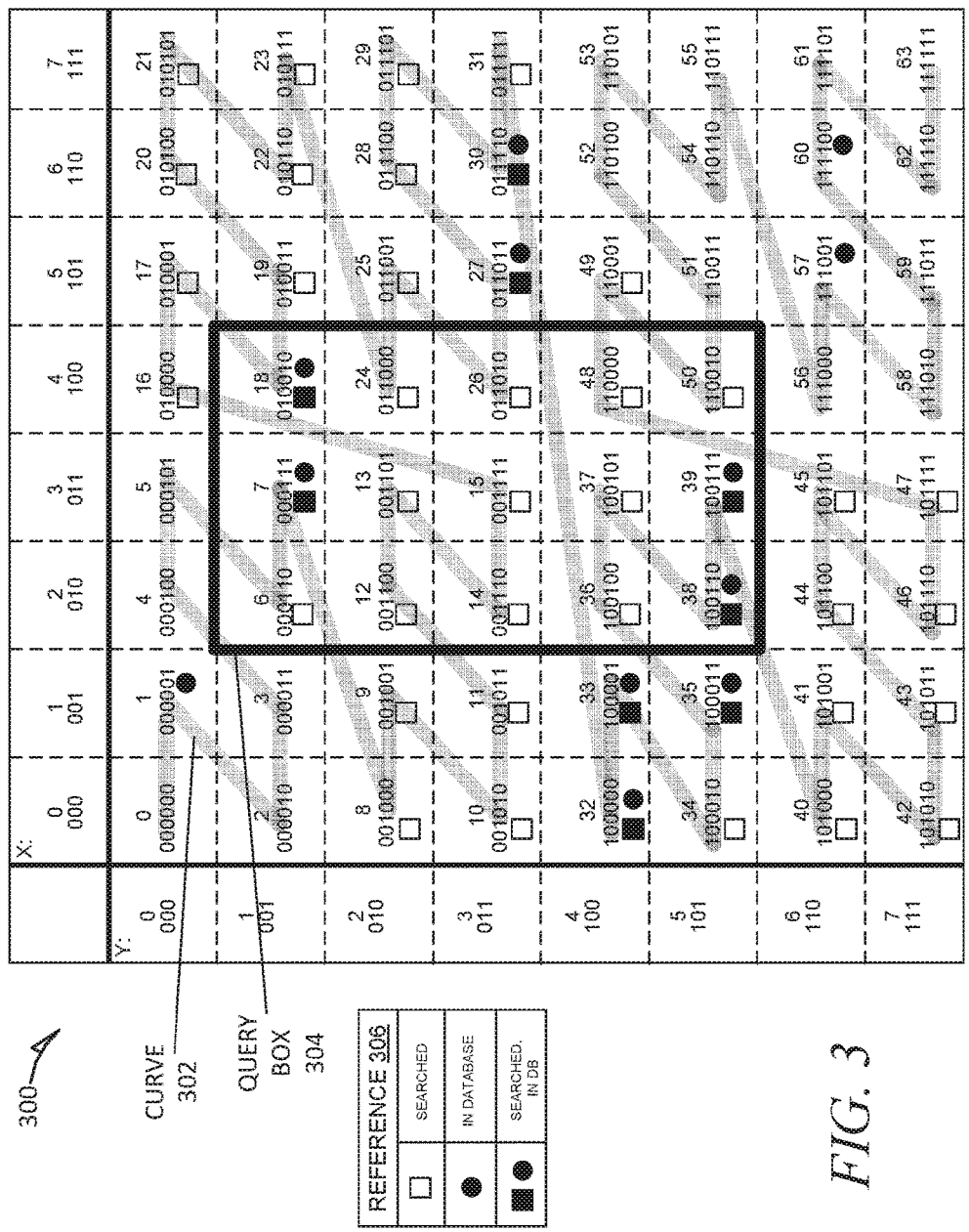
FIG. 3 illustrates a multi-range query for data in a multidimensional database with a space-filling curve, as according to some embodiments.

FIG. 3 shows an example data structure 300 having two dimensions, x and y, each of which span from 0 to 7, and each of which is referred to by a sequence of three bits. For example, referring to the x dimension, 0 is to 000, 1 is to 001, 2 is to 010, etc.; the y dimension is similarly arranged. The x and y dimensions correspond to columns of a relational database. The intersection of two columns from the x and y dimensions is a square that corresponds to a row of the relational database. For example, the square labeled "46" is a database row having intersecting values referenced by its x and y coordinates, 2 (binary 010) and 7 (binary 111), respectively.

As mentioned, each row may be encoded as an interleaved or alternating sequence from each x and y coordinate (or any number of coordinates, alternating through each dimension the same way). For example, row 46, which is referenced by 2. (binary 010) and 7 (binary 111), may be interleaved as follows: 101110, where the first digit is the first digit of binary 111, the second digit is the first digit of binary 010, the third digit is the second digit of 111, the fourth digit is the second digit of 010, the fifth digit is the third digit of 111, and the sixth digit is the third digit of 010. Similarly, any number of dimensions can be collapsed down to a single interleaved value the same way: interleaving coordinate values of each dimension.

A curve 302 is also illustrated in FIG. 3 as spanning the data structure 300. The curve 302 is a z-order space-filling curve that passes through every row in the data structure 300. Though the curve 302 is illustrated in just two dimensions, it is to be appreciated that, like other space-filling curves (e.g., Hilbert curves), the curve 302 can be extended to n dimensions to refer to a data structure having n dimensions. As such, the data structure 300 may map data in a high order of dimensions and corresponding columns. Thus, the curve 302 is a one-dimensional structure that can span any n-dimensional space, from which any point may be referenced by specifying interleaved coordinate values for a given point.

Queries for data in a plurality of rows of the data structure 300 may be between a specified plurality of ranges of any number of dimensions in the data structure. As one example, a query for data between two ranges or a plurality of ranges is illustrated as a query box, such as a query box 304. For ease of reference, though the term "box" is used here to refer to two ranges in two dimensions, the term "box" may also be used to refer to a query for data in any number of dimensions (e.g., in four dimensions, the box would be a hyper-cube query "box"). Further, the term "box" does not limit the proportion of ranges with respect to one another; that is, a "box" may be a square, rectangle, or other shapes having boundaries that correspond to limits specified in a query.

Though the data structure 300 comprises a number of rows from 0 to 63, not every row may contain data that is in a database being queried. A reference 306 is illustrated to elucidate what data may be managed or referenceable by data structure 300. Each row that is searched along the curve 302 is labeled with an empty box, as shown in reference 306. The points that are searched (e.g., rows labeled with empty boxes) may be identified as follows: first, identify the lower bounds (row 6) and upper bounds (row 50); second, all rows along the curve 302 between the lower bounds and upper bounds are searched by traversing the curve 302. For example, as illustrated, following the curve 302, each row from row 6 to row 50 is searchable and thus labeled with an empty box, for reference. As is evident, the number of rows searched along the curve 302 can far exceed the actual number of relevant rows inside the query box 304; there are 15 rows in the query box 304, yet 45 rows searched along the curve 302. Conventionally, this may present problems in using space-filling curves for database access because the lower and upper bounds for many queries create a curve 302 that covers vast numbers of the rows in the database, while only a small number of those rows are relevant to a given query.

Continuing, as illustrated in the reference 306, if the row under consideration in the database contains actual data, then the row is labeled with a black filled-in circle to indicate that data exists in the database. Further, a row that is both searched (as it is along the search path of the curve) or otherwise searchable and also contains data in the database is labeled with a black filled-in box next to the black filled-in circle, side-by-side, as illustrated in the reference 306. However, even if the data exists and even if the row is searched, the data may still not be what is being requested in the query. For example, row 27 is searched along the curve and contains data, but it is still not within the query box 304, so it is not relevant to data being requested. In contrast, for example, row 38 is searched, has data, and is within the query box 304, and thus is relevant to the data being requested.

Figure 4:
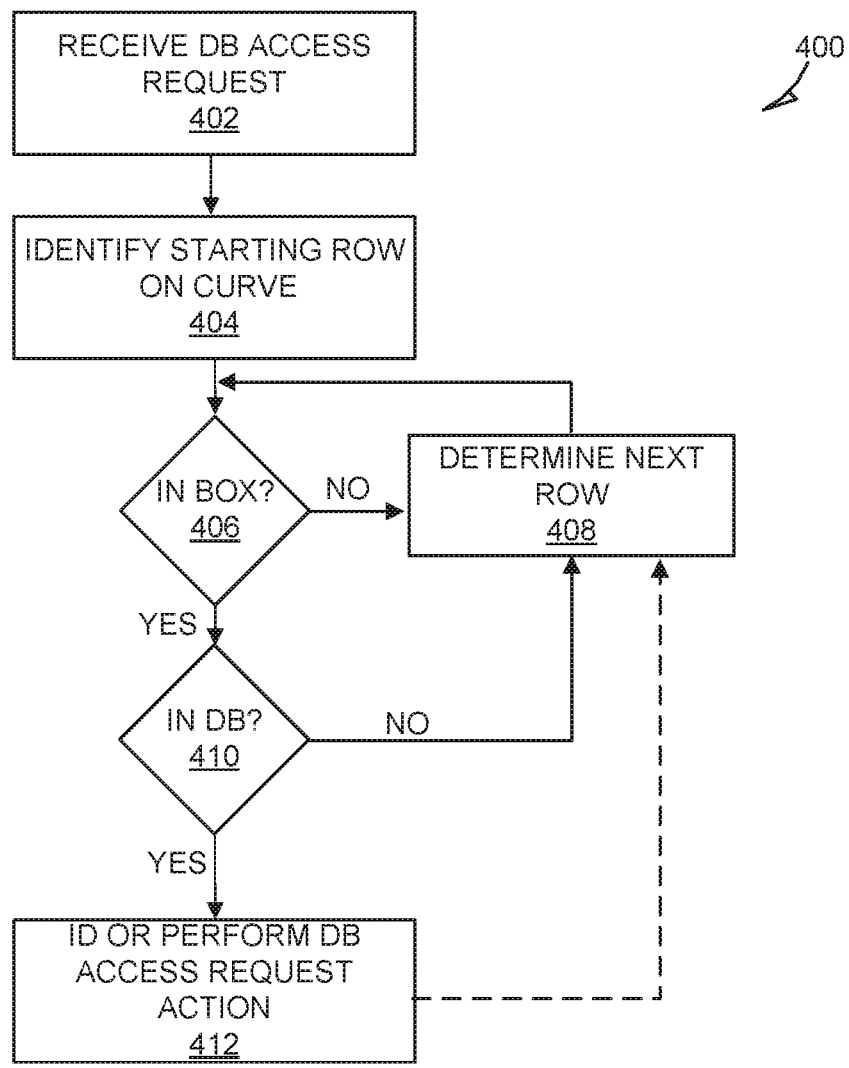
FIG. 4 illustrates a flowchart of a method for accessing data in the multidimensional database with a space-filling curve, as according to some embodiments.

FIG. 4 shows a flowchart 400 of a method for accessing data in the data structure 300 (e.g., a multidimensional database corresponding to a multidimensional space) with a space-filling curve, as according to some embodiments. At operation 402, a database access request is received by database access system 120. For example, the request may be a query requesting rows that match two ranges. For instance, with reference to FIG. 3, the data structure 300 may contain data describing a plurality of oranges. The x dimension corresponds to a column comprising entries for the weight of each orange, while the y dimension corresponds to a column comprising entries for the diameter of each orange. If the request corresponds to the query box 304, then the request is a query for oranges within a range of a specified weight (e.g., within the right and left side boundaries of the query box 304) and specified diameter (e.g., within the top and bottom boundaries of the query box 304).

As discussed, the curve 302 spans each row in the data structure 300. To search for query results, the curve 302 is searched from row 6 to row 50, which are the first and last rows within the query box 304, respectively. As illustrated, though the query is requesting only matches within the bounds of the query box 304, the curve 302 spans many rows outside the query box 304 (e.g., row 20, row 21, row 8, etc., are all outside the query box 304 but still within the curve 302 search limits of 6 and 50). As mentioned, these rows that are searched but outside the database access request parameters are labeled with square empty boxes, as illustrated in the reference 306.

in some embodiments, the curve 302 is used to search from the bottom up, from row 50 to 6, while in some embodiments, the curve 302 is used to search from the top down, from row 6 to 50. Assuming searching from the top down as an example, at operation 404 the starting row is identified as row 6. At operation 406, a determination is made as to whether the row is within the query box 304. If the row under consideration is not in the query box 304, then at operation 408, the next row along the curve 302 is identified and it is again determined whether the next row along the curve 302 is within the query box 304, Here, row 6 is within the query box 304, so the method continues to operation 410, where it is determined whether the row has data that is in the database (e.g., the real database that corresponds to the data structure 300). As row 6 does not have data in the database, as indicated by a lack of side-by-side black square and black circle, the method proceeds to operation 408, where the next row along the curve 302 is identified. In the example shown in FIG. 3, the next row along the curve 302 is row 7, which is within the query box 304 and has data in the database, as indicated by the side-by-side black square and circle. Thus, the analysis of row 7 is yes at operation 406 and yes at operation 410.

At operation 412, the requested database action may be performed. For example, the data within row 7 is read and returned to a user or application that requested the database action. In other embodiments, the database request of operation 402 requires that all rows within the query box be identified (e.g., bulk action) and then returned to the user or acted upon. As such, in some embodiments, after identifying row 7, the method continues to operation 408 (see dotted arrow), where all matches are identified (e.g., rows 7, 18, 38, and 39), after which some bulk database action may be performed, such as returning the rows as a query result or acting upon the rows (e.g., modifying, deleting).

Figure 6A:
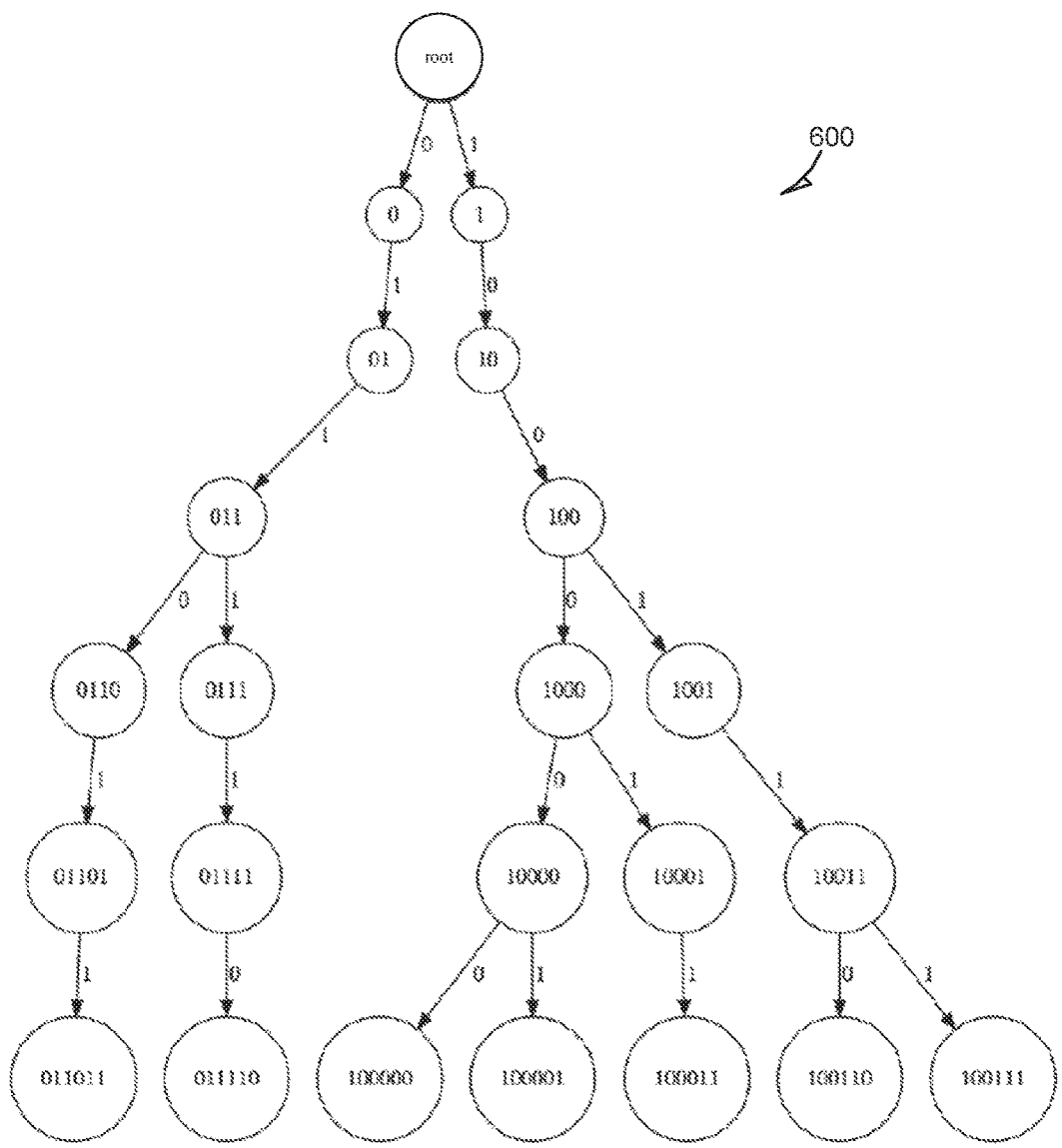
FIGS. 6A-6C illustrate different configurations for a binary tree which may have sonic nodes merged and may have a spawn threshold, as according to some embodiments.
Figure 6B:
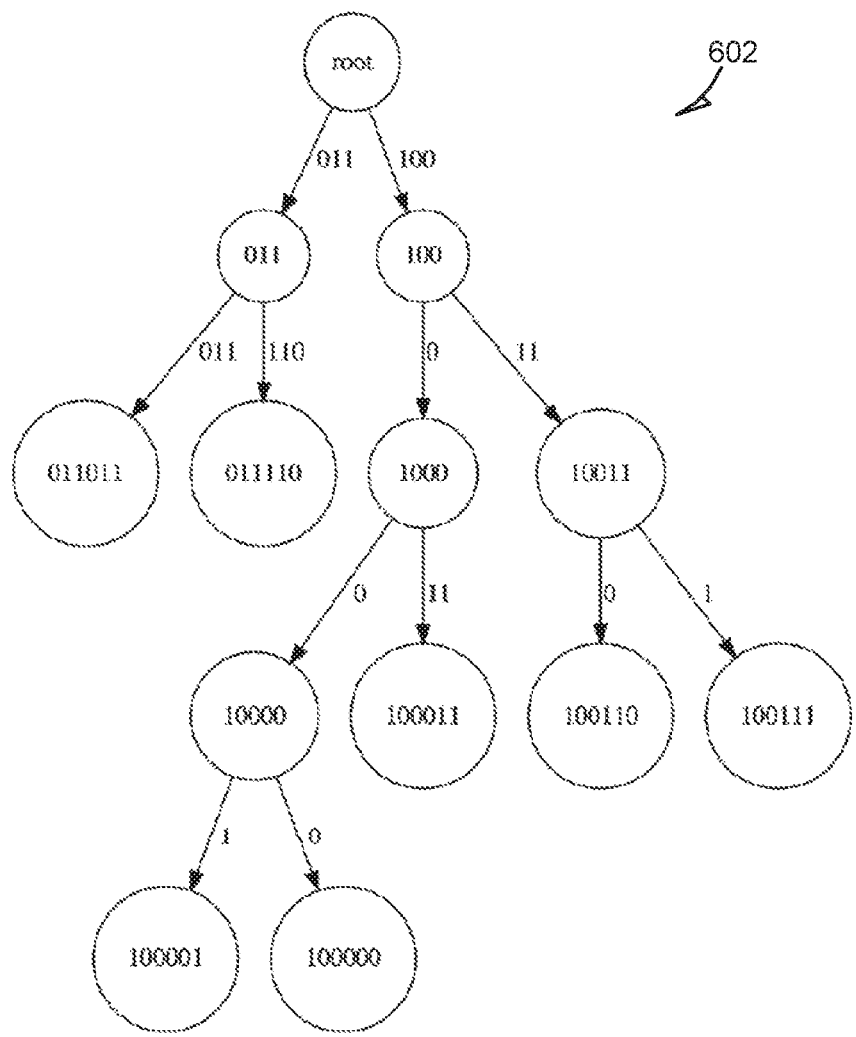
Figure 6C:
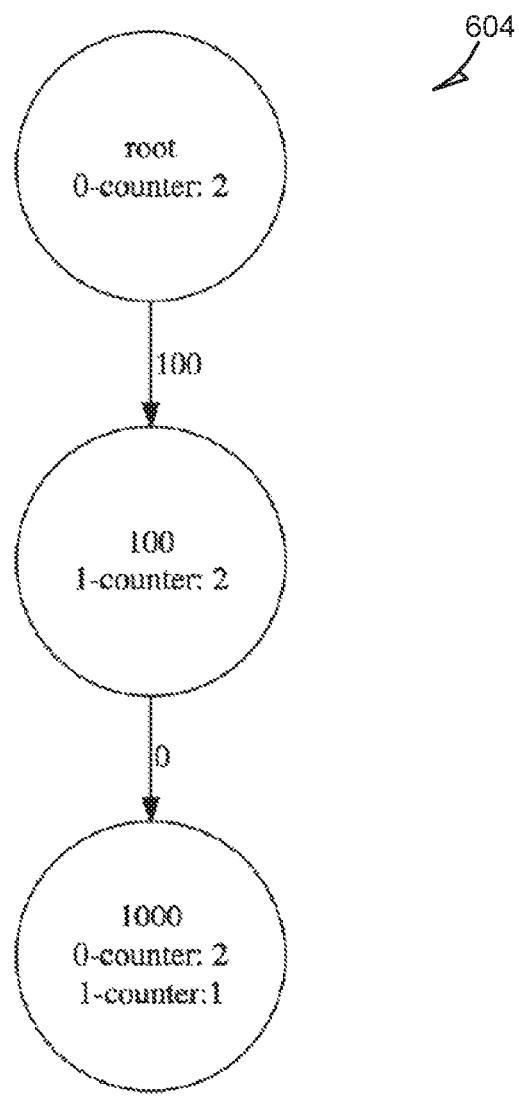

Referring back to FIG. 2, in some embodiments the database access application(s) 120 comprises a tree engine 204. The tree engine 204 uses a tree data structure, such as a binary tree, to store and look up rows that have data values in the database. FIGS. 6A-6C disclose how a tree data structure may be constructed and implemented, as according to some embodiments.

In some embodiments, the database access application(s) 120 comprises a range limit engine 206. The range limit engine 206 is responsible for identifying an upper and lower boundary of the query box 304 and limiting the search between the upper or lower boundaries or generating a new query box that has a top set to the upper boundary and a bottom side set to the lower boundary. Further details of the range limit engine 206 are discussed with reference to FIG. 10A-10B and FIG. 11.

In some embodiments, the database access application(s) 120 comprises an access engine 208 which is responsible for accessing the database 126. The access engine 208 may be configured for accessing different types of data stores, such as a relational database or a sorted key value database (e.g., HBase). In those embodiments, one or more of the curve engine 202, tree engine 204, or range limit engine 206 manages the improved access approaches using curves and sparse trees to identify which data should be accessed or retrieved. For example, a sparse tree data structure (e.g., which may cache data in rows, as discussed below) can be used to determine which data stores contain the requested data before the data stores are accessed.

Figure 5:
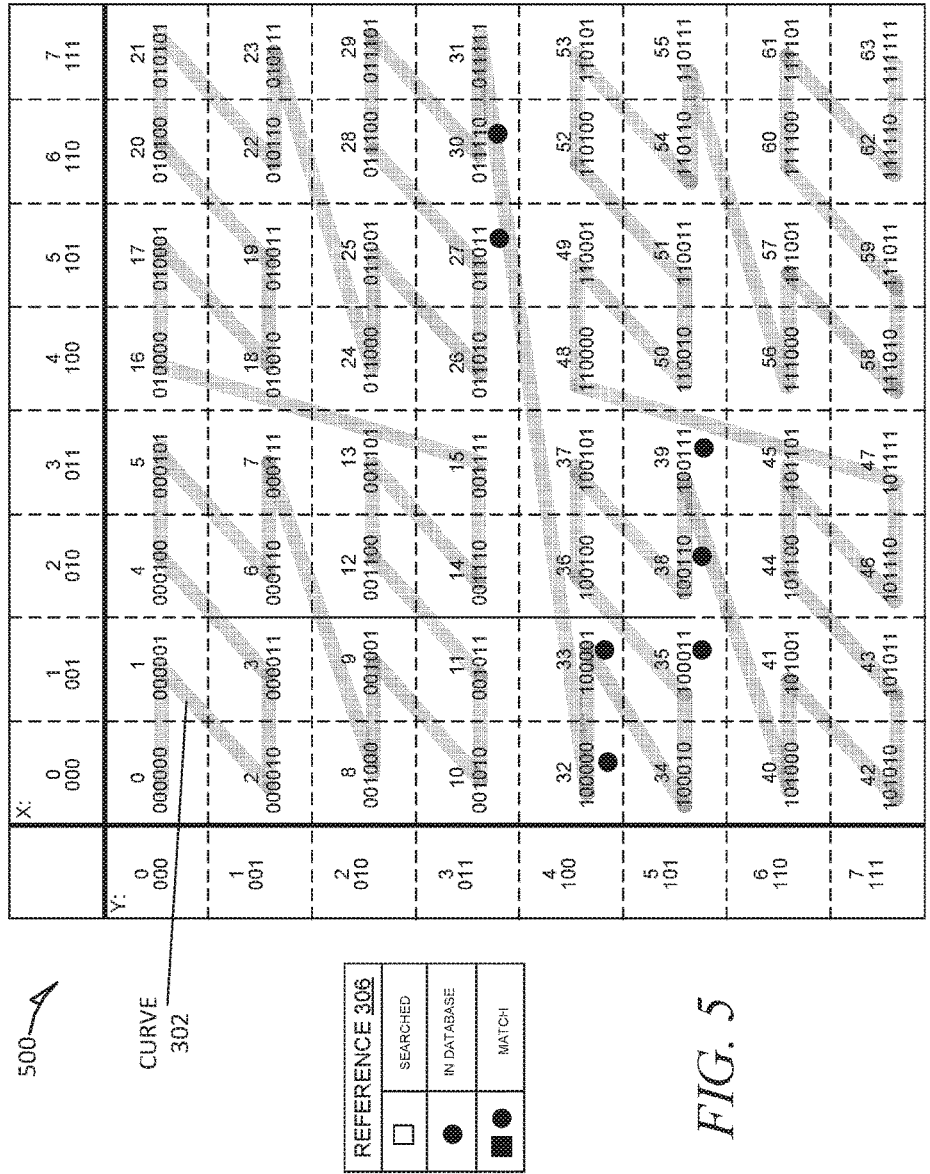
FIG. 5 illustrates a multi-range query for data in a multidimensional database with a space-filling curve with data demarcated, as according to some embodiments.

FIG. 5 illustrates a data structure 500 which stores data similarly to the data structure 300. That is, the data structure 500 has an x dimension and a y dimension that corresponds to columns of a database; intersections or squares are rows of the database; a curve 302 is illustrated as a z-order space-filling curve; and each point/row may be referenced using interleaved coordinates from the different dimensions. As illustrated, the database corresponding to the data structure 500 has actual data in rows 27, 30, 32, 33, 35, 38, and 39.

To store and look up which rows contain actual database data, a tree structure, such as a binary tree structure 600 of FIG. 6A, may be implemented. The binary tree structure 600 comprises a plurality of nodes illustrated as circles. Inside each circle is a number modified (e.g., by adding/appending digits) in order to arrive at that node. The arrows from node to node correspond to a digit(s) to be appended to arrive at the node immediately below. At the bottom of the binary tree structure 600 are six-digit-long nodes, each of which corresponds to a row that contains actual data; that is, the bottom nodes of the binary tree structure 600 correspond to the rows that contain actual data in FIG. 5.

As the binary tree structure 600 comprises the rows located in the database, the binary tree structure 600 can be implemented as a lookup, and can be traversed to determine whether a given row contains actual data. For example, to determine whether row 32, which has a interleaved coordinate value of "100000", is in the database, the binary tree structure 600 is checked: first, at the root level follow the path down to the "1" node (because "100000" starts with "1"), then follow the path down for each "0" to determine that, in fact, "100000" is in the binary tree structure 600, and hence in the database. As the amount of data in the data structure 500 grows, the binary tree structure 600 can sprawl out, taking up large amounts of memory. In addition to inefficient memory usage, large binary tree structures can cause delayed lookup times due to tree size.

FIG. 6B shows an improved tree structure in the form of a compressed tree structure 602, having merged nodes. In contrast with the binary tree structure 600, the compressed tree structure 602 merges similar nodes (e.g., nodes having common prefixes) into a single merged node. This saves memory as the tree is smaller in size, and increases lookup or tree traversal speed as there are fewer nodes to analyze. For example, again searching for "100000": the first branch from the root node is immediately to the node "100", thus skipping two nodes. At node "100", a 0 is appended to arrive at node "1000", another 0 is appended to arrive at node "10000", and another 0 is appended to arrive at node "100000", which is the last node, which indicates that indeed "100000" does in fact correspond to a row in the database that contains actual data. In this way, unnecessary nodes are merged out or skipped.

Further, each transition amount (e.g., digits along the arrows) can differ from nodes in different levels. For example, if searching for "100111", starting at node "100", the two-digit "11" can be added to jump down to node "10011", thereby merging over or skipping a node (e.g., appending "1" twice). Further, differing transition amounts can further compress the amount of data stored per path: as illustrated in FIG. 6B, there are more nodes (and more data to be processed) on the path from root to 100000 than on the path from root to 011011, the latter only have two transitions from root (e.g., 011 appended two times)

To further reduce memory usage and increase lookup performance, a sparse tree structure may be implemented. FIG. 6C shows one example of a sparse tree data structure 604 having merged nodes and a spawning threshold, as according to some embodiments. Each node has one or more counters that store how many lookup values are available at that node. In some embodiments, a spawn threshold is set such that a node cannot spawn new leaves (e.g., sub-nodes, nodes located below the current node) unless there are a certain number of actual database rows that exist for that node. For example, where the spawn limit is greater than 2, a node cannot spawn a sub-node if the sub-node leads to only 1 or 2 actual rows in the database. Instead, the 1 or 2 rows are stored locally and looked up at that node.

The lookup values are local to the node logically: they track nodes that exist (below the current node) but that are not located in the binary tree, which saves memory and increases lookup speed. To compare values for rows tracked by counters, the row values are retrieved directly and compared to values from a counter data store. In some embodiments, a single counter data structure may comprise all counter data stores for each node level, while in some embodiments several counter data stores may be implemented, one to store counter-tracked row identifiers for each corresponding node As an illustrative example, suppose "100011" is being sought, which corresponds to database row 35. Starting at the root node, the first digit for "100011" is "1", which does not correspond to the 0-counter, which stores rows that start with "0". As such, node "100" is transitioned to by adding/appending 100. At node "100", the fourth digit of "100011" is considered, and since it is a "0" again the counter is skipped and a transition down to node 1000 occurs (appending 0 in the process). Below node 1000 exist three database rows: 100001, 100000, and 100011; however, for each transition there are two or fewer rows. No counter exceeds the threshold, and thus all three rows are tracked by counters: the 1-counter stores a value for "100011", and the 0-counter stores values for "100001" and "100000". At this point the three rows may be retrieved to determine if any match the row being searched for, "100011", which one of the counter-tracked rows does indeed match.

As a contrasting example, starting over, assume "011011" is being sought. At root level, the first digit "0" of the sought row (i.e., 011011) is tracked by the 0-counter. As such, the two 0-counter-tracked rows may be retrieved from the counter data store and analyzed to see whether they match. As one of the counter-tracked rows is in fact a match, the row is identified as having data in the database.

In this way, a sparse tree can use a spawn-limiting threshold to ensure a compact memory footprint for the tree, by ensuring that extraneous transition data and node data is avoided and rows are directly accessible as a data store for each node level instead of a sprawling memory structure. In some embodiments, a sparse tree data structure comprising all entries of rows that have data in a database mapped by a space-filling curve is stored as a cache in a non-transitory memory and searched when queries require a determination as to whether a given row in a database contains data.

Figure 7A:
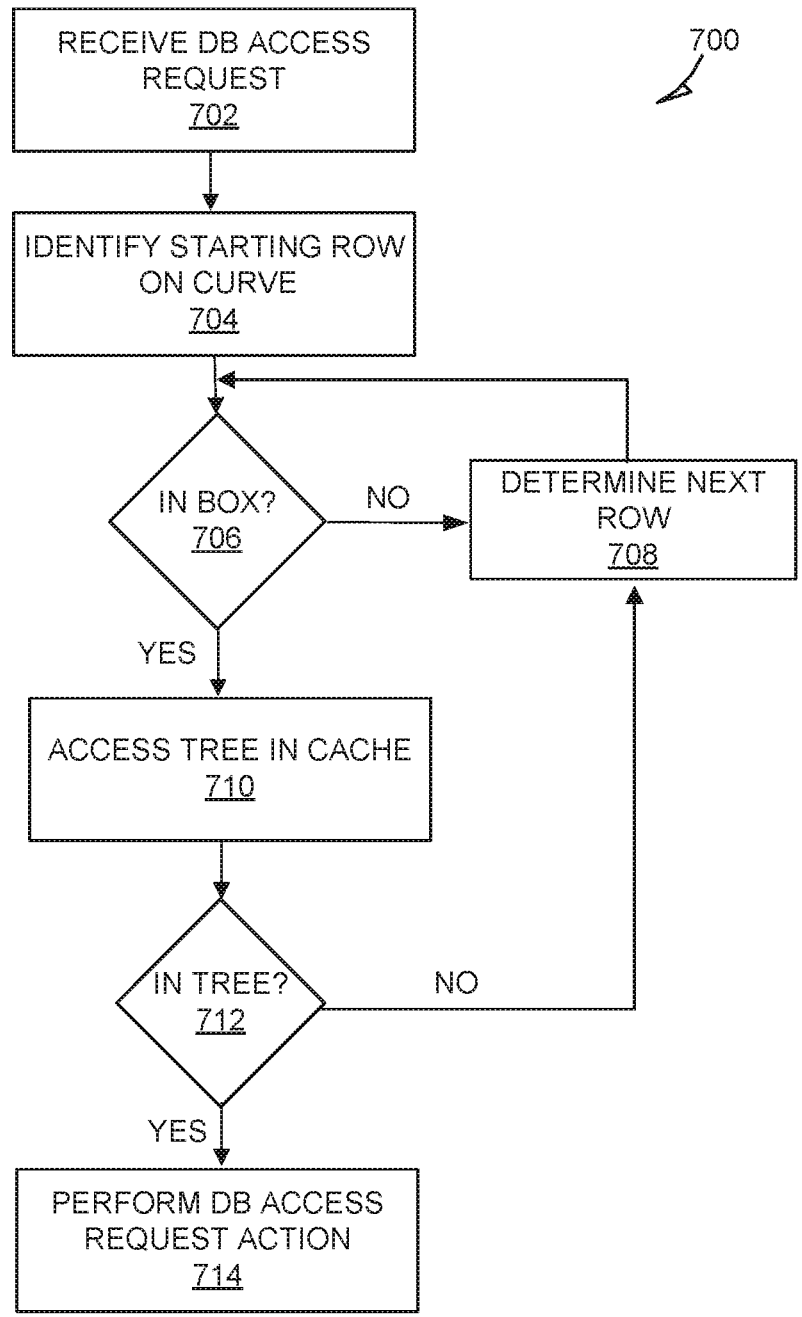
FIG. 7A illustrates a flowchart of a method for accessing data in a multidimensional database using a merge limited binary tree, as according to some embodiments.

FIG. 7A shows a flowchart 700 of a method for improved database access using a space-filling curve and a sparse tree data structure, as according to some embodiments. At operation 702, a database access request (e.g., CRUD) is received by the database access system 120. The database access request may be directed towards data stored in a multidimensional database structure collapsed down to one dimension having rows referred to using interleaved coordinates, as discussed above.

At operation 704, a starting row is identified by the database access system 120. In some embodiments, optionally, before the starting row is identified a query "box" in a plurality of dimensions may be identified and the starting row may be identified as the highest row row 6) or lowest row (e.g., row 50) within the bounds of the query box. Accordingly, the starting row may be the bottom row of the query box for a search "up" the curve, or the starting row may be the top row of the query box for a search "down" using the curve 302.

At operation 706, a check is made to determine whether the row under consideration is within the query box using the database access system 120. This check may be skipped for the starting row (as it was selected in the query box), but may be implemented for subsequent rows along the curve 302 because the curve 302 follows a search path that crosses in and out of the query box.

If the row is not within the bounds of the query box, then at operation 708, the next row along the curve 302 is identified using the curve engine 202 and again a check may be made at operation 706 as to whether the next row is in within the query box. It is understood that the curve 302 is searched from row to row, in increasing or decreasing order depending on whether a top-down search or a bottom-up search is being performed. For example, if the starting row is row 6, then the "next row" along the curve 302 is row 7; whereas if the starting row is row 50, then the "next row" along the curve 302 is row 49, which may not be in the query box (see FIG. 3).

Continuing with the assumption that the row under consideration (e.g., the starting row 6) passes the check at operation 706, at operation 710, a cache comprising a sparse tree is accessed using the tree engine 204. The sparse tree maps entries of which rows exist in the database (e.g., which rows contain actual database data) in a plurality of nodes connected by bit transitions. In some embodiments, the sparse tree comprises merged nodes, bit transitions that add one or more bits, and bit counters, as discussed above with reference to FIGS. 6A-6C.

At operation 712, if the row under consideration is not found in the sparse tree, then the method returns to operation 708, where the next row along the curve 302 is identified using the curve engine 202. if at operation 712 the row under consideration is in the sparse tree, then at operation 714, the row is provided or added to a query result using the access engine 208.

Figure 7B:
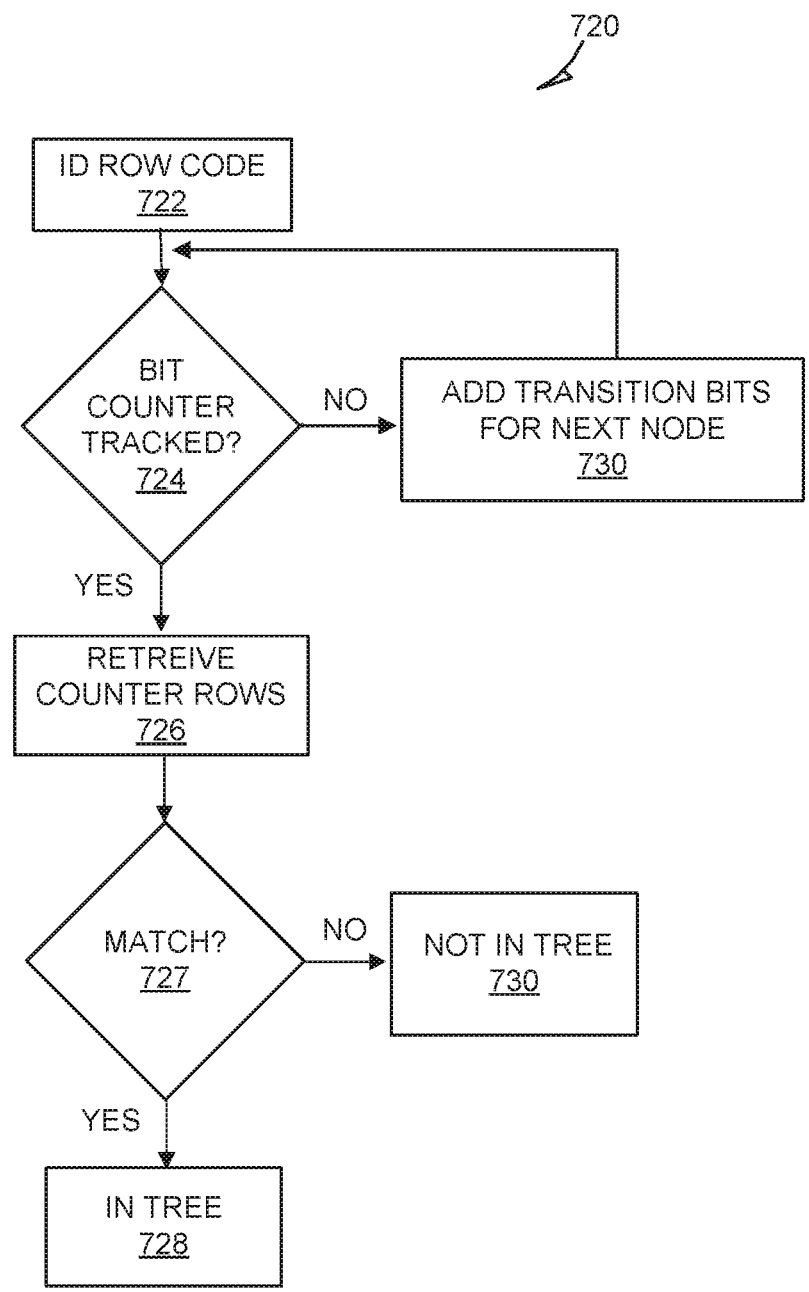
FIG. 7B illustrates a flowchart of a method for traversing a sparse binary tree for locating data in a multidimensional database, as according to some embodiments.

FIG. 7B shows a flowchart 720 of a method for determining whether a row is in a database using a sparse tree using the tree engine 204, as according to some embodiments. The method of the flowchart 720 may be implemented as a subroutine or function to operation 712 in FIG. 7A, or may also be directly integrated as an inline process of the flowchart 700. At operation 722, a row code is identified for the row under consideration. As used here, a row code is a row identifier, which refers to interleaved coordinates comprising alternating bits of columns of different dimensions, as discussed above.

At operation 724, a determination is made as to whether the bit under consideration (of the row identifier of the row under consideration) is being tracked by a counter. For example, with reference to FIG. 6C, if the row identifier is "100000", then there is no bit counter for the first digit at the first node (since at the first node there is only a 0-counter). As such, the process goes to operation 730, where additional transition bits are appended and the row is reanalyzed at the new node, As a contrasting example, assume the row identifier under analysis is 011011. Then at operation 724, the row is bit-counter-tracked, so the method continues to operation 726. At operation 726, the rows that are tracked by the counter for that node are retrieved from the counter data store. At operation 727, there is a determination as to whether any of the retrieved counter rows match the row under consideration. If none match, then at operation 730 a value is returned indicating that the row under consideration is not in the tree. In contrast, if one of the retrieved counter rows does match the row under consideration, then at operation 728, a value is returned that indicates that the row under consideration is in the sparse tree (e.g., corresponding to the row having data in the database).

Figure 8A:
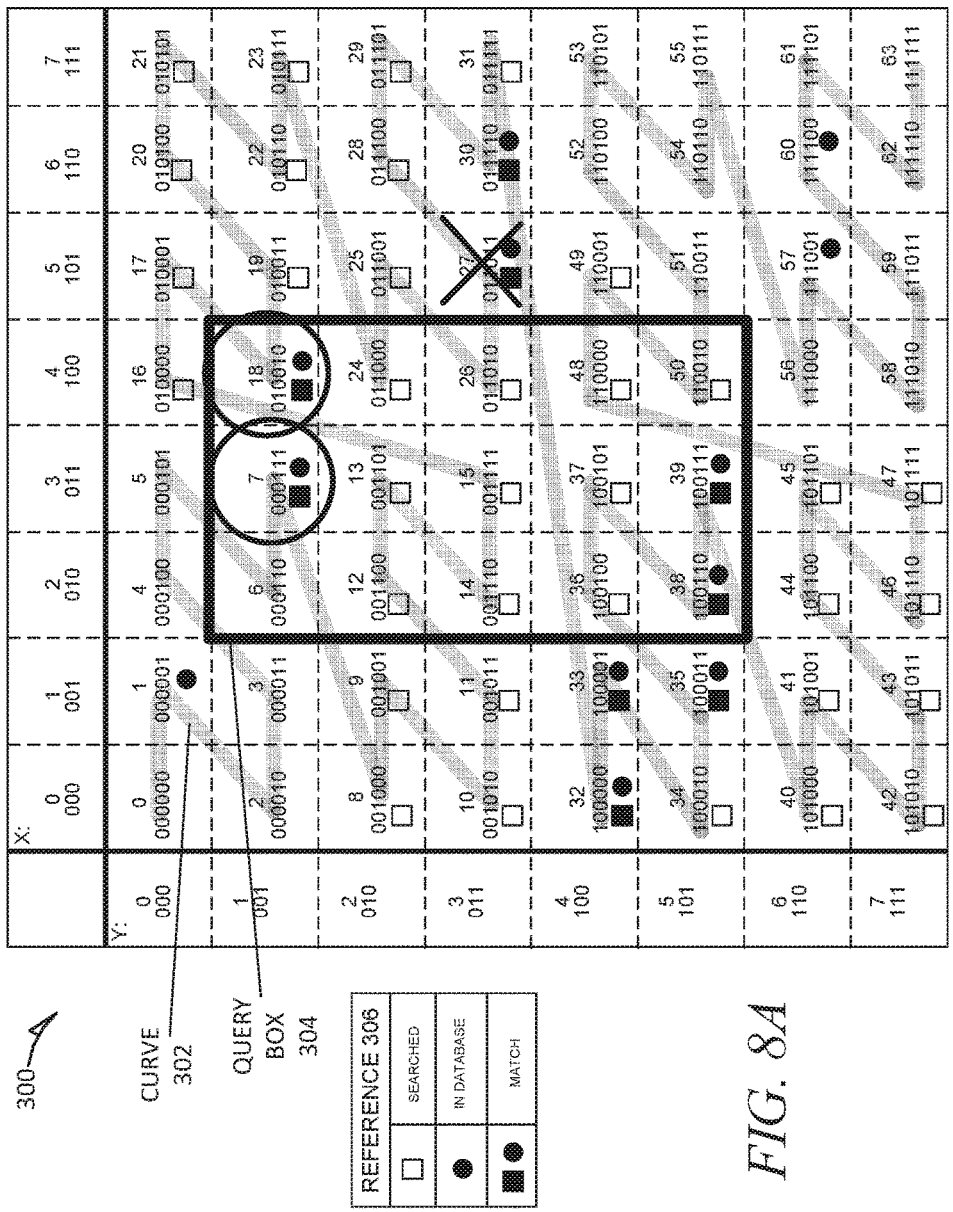
FIGS. 8A and 8B illustrate a multi-range query for data in a multidimensional database where different rows in the database are accessed according to position along the curve and within a query box, as according to some embodiments.
Figure 8B:
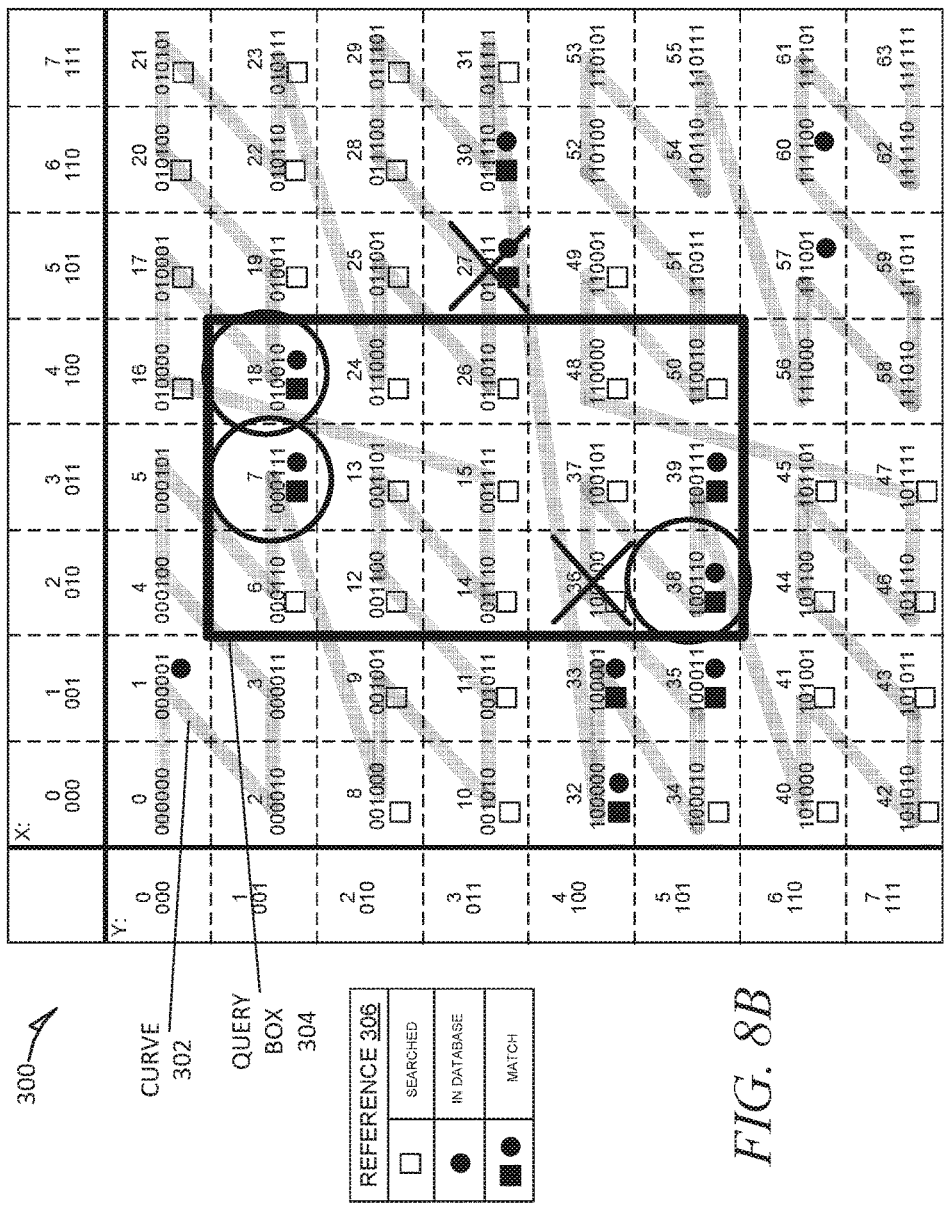
Figure 9:
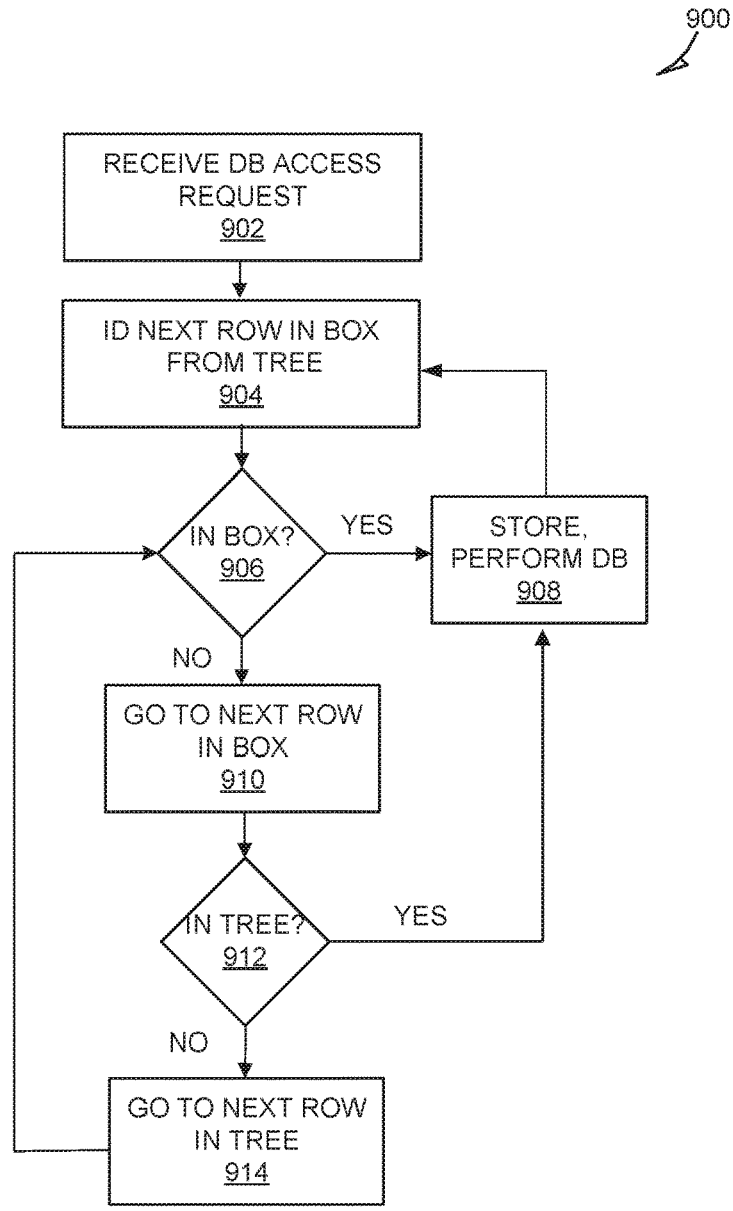
FIG. 9 illustrates a flowchart of a method for querying data in a multidimensional database where different rows in the database are accessed according to position along the curve and within a query box, as according to some embodiments.

FIGS. 8A-8B illustrate the data structure 300 that is discussed with respect to FIG. 9, which shows a flowchart 900 of an efficient method for database reseeks, as according to some embodiments. Database reseeks can be performed to reduce the number of irrelevant rows analyzed by alternating between query box relocations and cache checks. Referring to FIG. 9, at operation 902 a database access request is received by the database access system 120. The database access request may be a request for data between two ranges of the multidimensional database represented by the data structure 300 (e.g., on the x dimension between 2 and 4, and on the y dimension between 1 and 5). As such, a query box 304 is identified and stored as a data structure for reference by the database access system 120.

At operation 904, the next row for analysis is identified from the sparse tree data structure 604 using the tree engine 204, according to one embodiment. If the search is initializing and no row has yet been analyzed, the next row is the starting row. In some embodiments, the starting row is the first row in the tree structure after the lower boundary. For example, referring to FIG. 8A, the lower boundary is row 6, and thus the tree is accessed to determine that the first row in the tree structure after row 6 is row 7.

Continuing to operation 906, the database access system 120 determines whether the next row (e.g. row 7) is in the query box 304. For example, box 7 is in the query box 304, so at operation 908, the data from row 7 is stored or acted upon, as specified by the database access request. The method then returns to operation 904, where the next row is identified (e.g., row 18), which at operation 906 is determined to also be within the query box 304. For example, data from row 18 is similarly processed at operation 908.

Again at operation 904, the tree engine 204 access the tree for the next row, which is now, for example row 27. At operation 906, the database access system 120 determines that row 27 is not within the query box 304; thus, row 27 comprises out-of-range data (denoted by "X" on the row). To reseek to get back within the query box 304, at operation 910, the curve engine 202 follows curve 302 to identify the next row that is after row 27 but also within the query box 304. The curve 302 is processed via the curve engine 202, and the next row after row 27 that is within the query box 304 is row 36.

At operation 912, the tree engine determines whether row 36 is in the tree data structure. If row 36 is in the tree data structure, then the method proceeds to operation 908. However, referring to FIG. 8B, row 36 is not stored in the tree structure, and thus is not in the database (as indicated by the "X" and empty square in row 36), so at operation 914, the tree structure is accessed to determine what row is greater than row 36 (e.g., a next row). Here, the row in the tree structure that is greater than row 36 is row 38. The process then loops back to operation 906, to determine whether row 38 is in the query box 304. Here, row 38 is in the query box 304, so row 38 is stored or acted upon at operation 908. The above process of alternating between query box reseeking and checking and tree structure reseeking and checking can be repeated until the upper boundary (row 50) is reached.

Figure 10A:
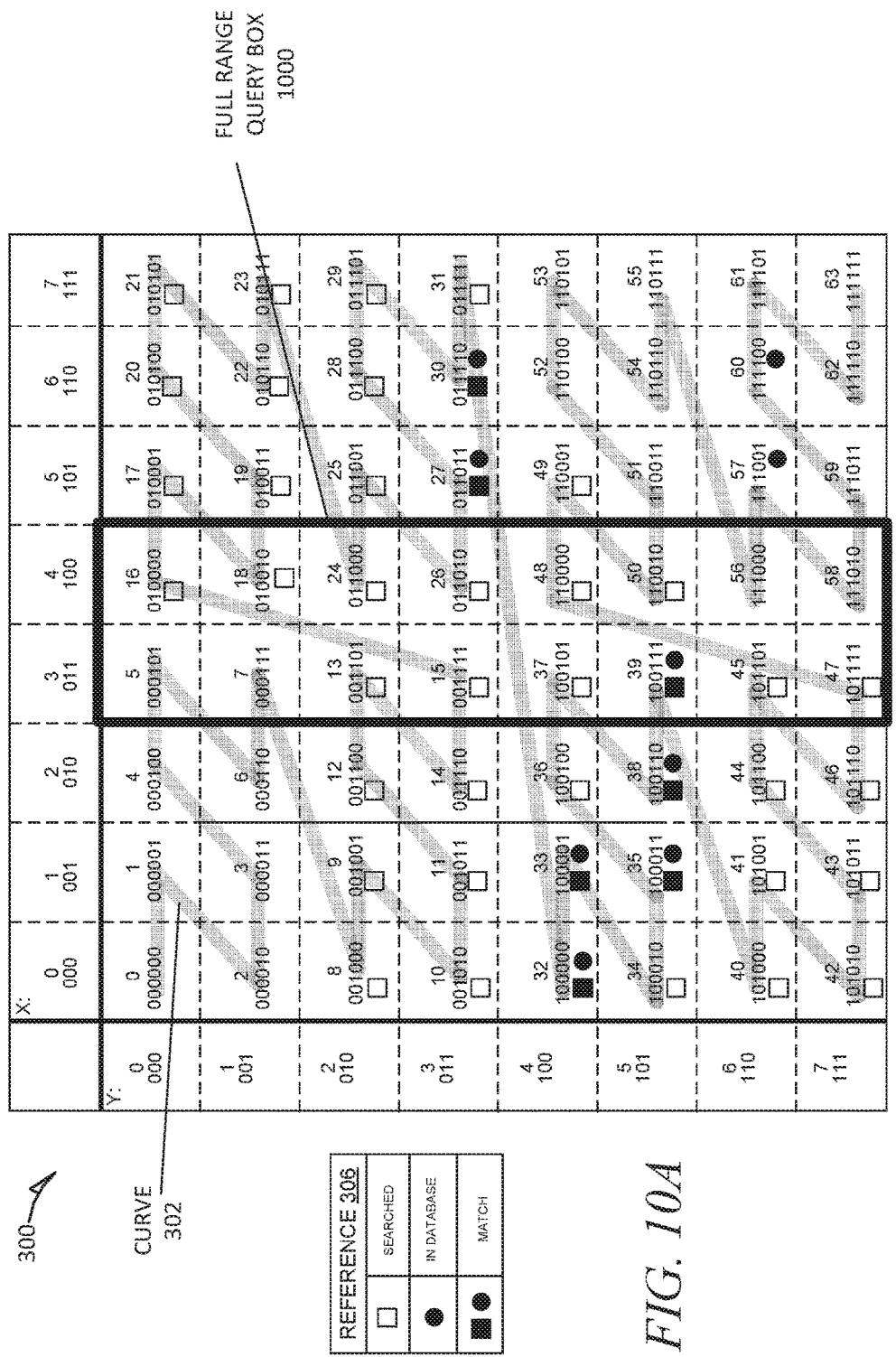
FIGS. 10A and 10B illustrate a multi-range query for data in a multidimensional database where boundary limits are implemented, as according to some embodiments.
Figure 10B:
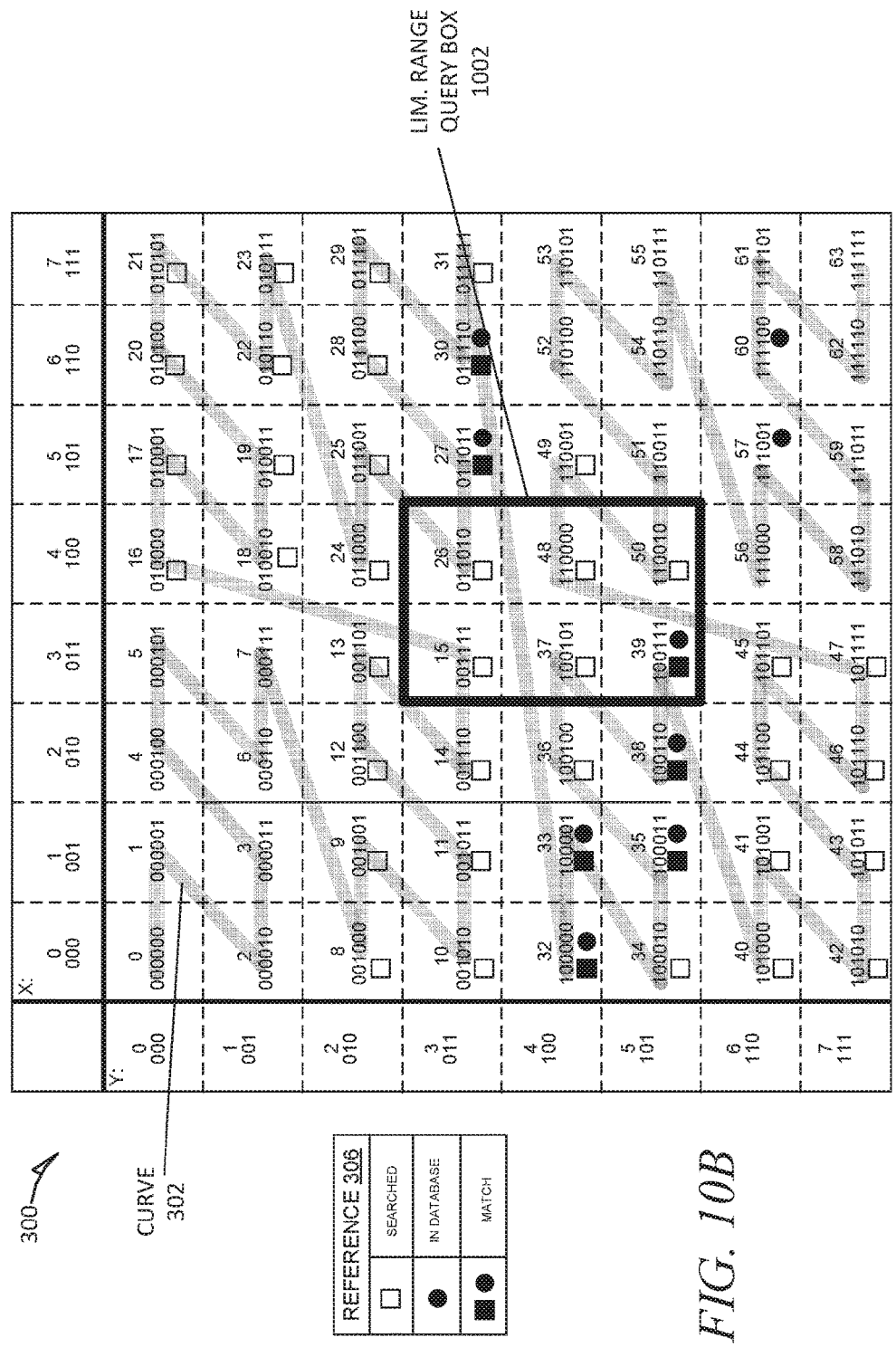

FIGS. 10A-B illustrate an approach for limiting the upper and lower boundaries of a full range search, as according to some embodiments. In one example, a database access request is received that specifies only one dimension. For example, as discussed above, where the x axis corresponds to orange weights and the y axis corresponds to orange diameters, a full range query box 1000 (FIG. 10A.) corresponds to a database request that limits only the weight of the oranges, but not the diameter of the oranges; thus, the full range query box 1000 searches the full range of the y dimension, from 0 to 7.

In some embodiments, the tree data structure 604 is accessed by tree engine 204 to determine the domain of y-dimension values for the query. For example, the tree data structure 604 is accessed to determine what the lowest value (row 27) and the highest value (row 39) are in the tree.

The lowest and the highest values may be transmitted to the range limit engine 206 for further processing, as follows. The lowest value, row 27, is then the lower boundary for the search, and the highest value, row 39, is the upper boundary. Once the lower and upper boundaries are identified, the range limit full range query box 1000 is reconstructed or tapered to generate a limited range query box 1002 (FIG. 10B). In this way, by reconfiguring the original full range query box 1000, the search is made more efficient. Using the limited range query box 1002, the database access request may be performed using any of the above methods (e.g., of FIGS. 7A-7B or FIG. 9).

Figure 11:
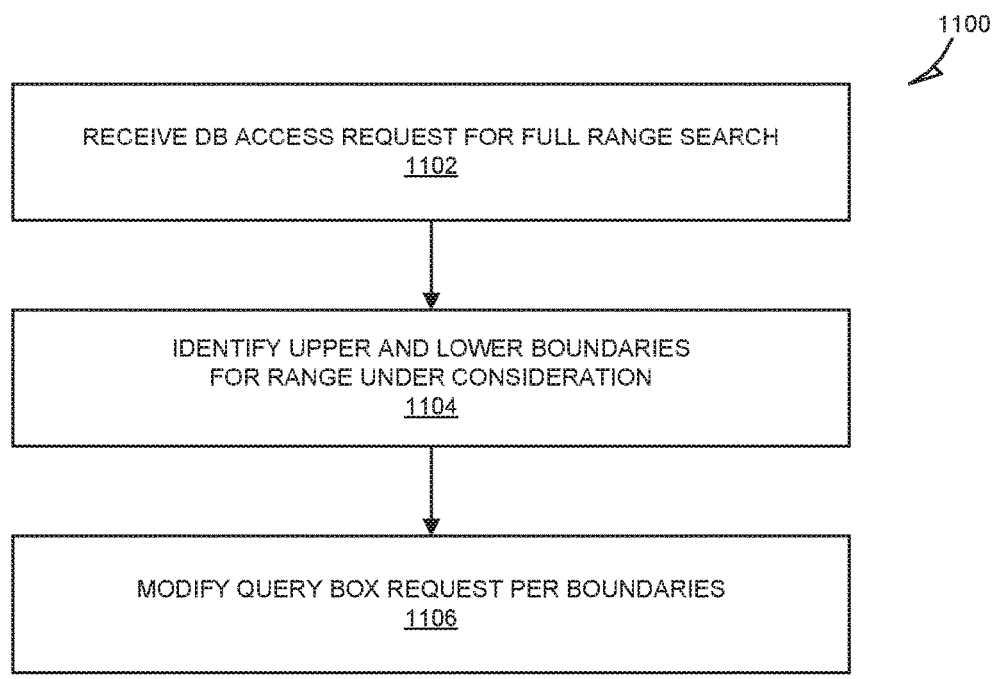
FIG. 11 shows a flowchart of a method for processing a multi-range query using boundary limits, as according to some embodiments.

FIG. 11 shows a flowchart 1100 of a method for limiting the boundaries of a query box using the range limit engine 206, as according to some embodiments. At operation 1102, a database access request for a full range search is received by the database access application(s) 120. At operation 1104, the range limit engine 206 identifies the lowest row as the lower boundary and the highest row as the upper boundary. At operation 1106, the range limit engine 206 adjusts the lower boundary (e.g., top side of the full range query box 1000) to a new lower boundary set by the lowest row. Also at operation 1106, the range limit engine 206 adjusts the existing upper boundary (e.g., the bottom side of the full range query box 1000) to a new upper boundary set by the highest row. The result is the limited range query box 1002, which is used in more efficient database operations, such as those shown in FIGS. 7A-7B and FIG. 9.

Thus, what has been described is an approach for improved access of databases using a space-filling curve, such as a z-order curve, and a sparse tree. The columns of the database correspond to dimensions of a multidimensional data structure. The space-filling curve traverses every point in n-dimensional space of the multidimensional data structure. The sparse tree can be implemented as a cache to store which rows of the multidimensional data structure have actual data in them. The sparse tree may have one or more nodes merged into a single node if they share the same prefixes. The transitions between nodes in the tree may be one-bit transitions that are appended as the tree is traversed from node to node. The sparse tree may have one or more node limits at each node, such that a node may not spawn new sub-nodes unless the number of rows that the node leads to surpasses the node limit. As the multidimensional data structure is searched, the search path may be adjusted by reseeking back to rows that are located in the sparse tree; further, the search path may be adjusted by reseeking back to rows that are located within a query box.

Machine Architecture

Figure 12:
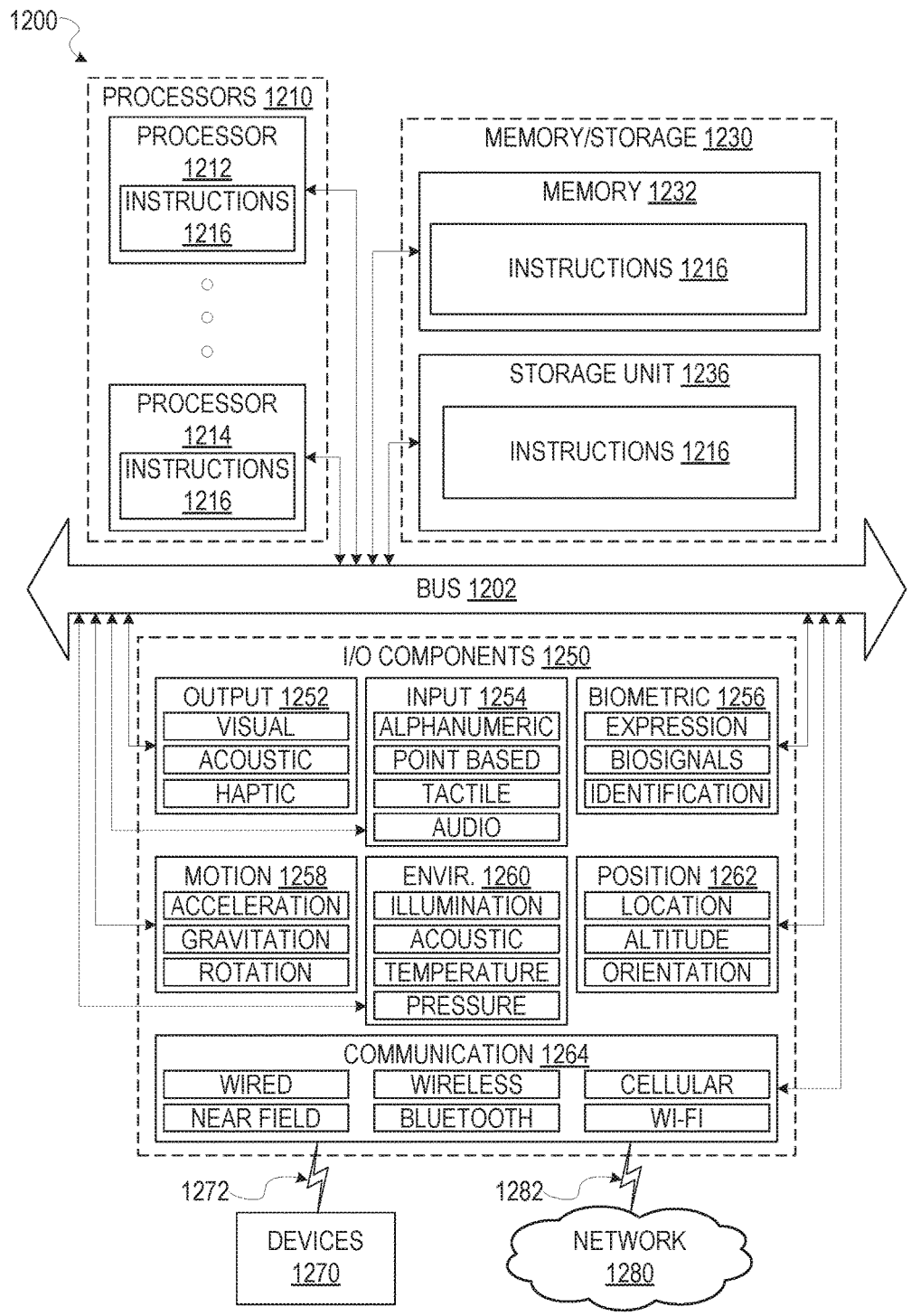
FIG. 12 is a diagrammatic representation of a machine in the example form of a computer system within which a set of instructions for causing the machine to perform any one or more of the methodologies discussed herein may be executed.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may include executable code that causes the machine 1200 to execute the methods of FIGS. 4, 7A, 7B, 9, and 11, as well as the associated functionalities described herein. These instructions transform the general, non-programmed machine into a particular machine programmed to carry out the described and illustrated functions of the engines disclosed herein, such as the curve engine 202, tree engine 204, range limit engine 206, and access engine 208. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. By way of non-limiting example, the machine 1200 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC), another processor, or any suitable combination thereof) may include, for example, a processor 1212 and a processor 1214 that may execute the instructions 1216. The term "processor" is intended to include a multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of the processors 1210 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a. physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), acoustic sensor components (e.g., one or more microphones that detect background noise or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272 respectively. For example, the communication components 1264 may include a network interface component or other suitable device to interface with the network 1280. in further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a. Universal Serial Bus (USB)).

Moreover, the communication components 1264 may detect identifiers or include components operable to detect identifiers. For example, the communication components 1264 may include Radio Frequency Identification (REED) tag reader components, NFC smart tag detection components, optical reader components (e.g., an optical sensor to detect one-dimensional bar codes such as Universal Product Code (UPC) bar code, multidimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be mitten in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network (e.g., the communication network 104 of FIG. 1).

in example embodiments, operations may be performed by one or more programmable processors executing a computer program to perform functions by operating on input data and generating output, Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Language

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled. Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description. All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "a.t least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein."

Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
   identifying, using one or more processors of a machine, a query box for a query against a multidimensional database having rows with curve coordinates that map to a curve data structure spanning the multidimensional database;
   identifying, in the query box, an initial row having an initial curve coordinate;
   identifying, using a tree data structure, a row that stores data that has a curve coordinate nearest to an initial curve coordinate of the initial row, the tree data structure being a cache of which rows in the multidimensional database store data;
   determining that the identified row satisfies the query based on the identified row being located within the query box; and
   storing data of the identified row as a query result.

2. The method of claim 1, wherein the query specifies a range and the initial row is a beginning of the range.

3. The method of claim 1, wherein the tree data structure comprises a plurality of curve coordinates of rows that store data, and wherein identifying the row that stores data as being nearest to the initial row, comprises:
   determining, using the tree data structure, that the curve coordinate of the row is numerically nearest to the initial curve coordinate of the initial row.

4. The method of claim 3, wherein the initial curve coordinate is not in the plurality of curve coordinates of the tree data structure.

5. The method of claim 1, further comprising:
   identifying, using the tree data structure, a supplementary row that stores data that is nearest to the identified row; and
   determining that the supplementary row is not an additional query result based on the supplementary row not being within the query box.

6. The method of claim 5, further comprising:
   identifying another row by reseeking the curve data structure back into the query box; and
   determining that the another row is a further query result based on the another row being in the tree data structure.

7. The method of claim 1, wherein the tree data structure is a binary tree with a node spawning threshold.

8. The method of claim 3, wherein determining that the curve coordinate is nearest comprises determining that the curve coordinate is a next largest curve coordinate after the initial curve coordinate.

9. The method of claim 1, wherein the curve data structure is a space filling curve and curve coordinates are interleaved from one or more column coordinates of one or more columns in the multidimensional database.

10. A system comprising:
    one or more processors of a machine; and
    a memory storing instructions that, when executed by the one or more processors, cause the machine to perform operations comprising:
    identifying a query box for a query against a multidimensional database having rows with curve coordinates that map to a curve data structure spanning the multidimensional database;
    identifying, in the query box, an initial row having an initial curve coordinate;
    identifying, using a tree data structure, a row that stores data that has a curve coordinate nearest to an initial curve coordinate of the initial row, the tree data structure being a cache of which rows in the multidimensional database store data; and
    determining that the identified row satisfies the query based on the identified row being located within the query box; and
    storing data of the identified row as a query result.

11. The system of claim 10, wherein the query specifies a range and the initial row is a beginning of the range.

12. The system of claim 10, wherein the tree data structure comprises a plurality of curve coordinates of rows that store data, and wherein identifying the row that stores data as being nearest to the initial row, comprises:

determining, using the tree data structure, that the curve coordinate of the row is numerically nearest to the initial curve coordinate of the initial row.

13. The system of claim 12, wherein the initial curve coordinate is not in the plurality of curve coordinates of the tree data structure.

14. The system of claim 10, wherein the operations further comprise:

identifying, using the tree data structure, a supplementary row that stores data that is nearest to the identified row; and determining that the supplementary row is not an additional query result based on the supplementary row not being within the query box.

15. The system of claim 14, the operations further comprising:

identifying another row by reseeking the curve data structure back into the query box; and determining that the another row is a further query result based on the another row being in the tree data structure.

16. The system of claim 10, wherein the tree data structure is a binary tree with a node spawning threshold.

17. The system of claim 12, wherein determining that the curve coordinate is nearest comprises determining that the curve coordinate is a next largest curve coordinate after the initial curve coordinate.

18. The system of claim 10, wherein the curve data structure is a space filling curve and curve coordinates are interleaved from one or more column coordinates of one or more columns in the multidimensional database.

19. A machine-readable storage device embodying instructions that, when executed by one or more processors of a machine, cause the machine to perform operations comprising:

identifying a query box for a query against a multidimensional database having rows with curve coordinates that map to a curve data structure spanning the multidimensional database;

identifying, in the query box, an initial row having an initial curve coordinate;

identifying, using a tree data structure, a row that stores data that has a curve coordinate nearest to an initial curve coordinate of the initial row, the tree data structure being a cache of which rows in the multidimensional database store data;

determining that the identified row satisfies the query based on the identified row being located within the query box; and storing data of the identified row as a query result.

20. The machine-readable storage device of claim 19, wherein the tree data structure comprises a plurality of curve coordinates of rows that store data, and wherein identifying the row that stores data as being nearest to the initial row, comprises:

determining, using the tree data structure, that the curve coordinate of the row is numerically nearest to the initial curve coordinate of the initial row.

* * * * *